(12) United States Patent
Hotta et al.

(10) Patent No.: US 10,133,937 B2
(45) Date of Patent: Nov. 20, 2018

(54) CROWD MONITORING SYSTEM

(71) Applicant: Hitachi Kokusai Electric Inc., Minato-ku, Tokyo (JP)

(72) Inventors: Miyako Hotta, Tokyo (JP); Masanori Miyoshi, Tokyo (JP); Kazunari Iwanaga, Tokyo (JP); Mitsue Ito, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 15/533,101

(22) PCT Filed: Dec. 21, 2015

(86) PCT No.: PCT/JP2015/085618
§ 371 (c)(1),
(2) Date: Jun. 5, 2017

(87) PCT Pub. No.: WO2016/104395
PCT Pub. Date: Jun. 30, 2016

(65) Prior Publication Data
US 2017/0351924 A1 Dec. 7, 2017

(30) Foreign Application Priority Data
Dec. 24, 2014 (JP) ................. 2014-259667

(51) Int. Cl.
*G06K 9/00* (2006.01)
*G06T 7/246* (2017.01)
*G06K 9/46* (2006.01)

(52) U.S. Cl.
CPC ....... *G06K 9/00778* (2013.01); *G06K 9/4604* (2013.01); *G06T 7/246* (2017.01);
(Continued)

(58) Field of Classification Search
CPC .............. G06K 9/00778; G06K 9/4604; G06T 2207/30232; G06T 2207/30242;
(Continued)

(56) References Cited

U.S. PATENT DOCUMENTS 9,240,051 B2 * 1/2016 Liu .................... G06K 9/00362
2007/0031005 A1 * 2/2007 Paragios ............ G06K 9/00778
382/103
(Continued)

FOREIGN PATENT DOCUMENTS

JP 2006-85366 A 3/2006
JP 2008-217184 A 9/2008
(Continued)

OTHER PUBLICATIONS

International Search Report (PCT/ISA/210) issued in PCT Application No. PCT/JP2015/085618 dated Mar. 8, 2016 with English translation (Four (4) pages).
(Continued)

*Primary Examiner* — Tom Y Lu
(74) *Attorney, Agent, or Firm* — Crowell & Moring LLP

(57) ABSTRACT

The present invention provides a crowd monitoring system with which it is possible to obtain a crowd density accurately, irrespective of the congestion state. This crowd monitoring system 100 is provided with: an image acquiring unit 101 which acquires a plurality of images; an arithmetic logic unit 108; and a storage unit 106 which stores information relating to relationships between image feature quantities and an object density, acquired in advance, and information relating to relationships between motion feature quantities and the object density. The arithmetic logic unit 108 comprises: an image feature quantity acquiring unit 103 which obtains image feature quantities of objects in the acquired images; a motion line acquiring unit 104 which
(Continued)

obtains motion lines of the objects in the acquired images; a motion feature quantity acquiring unit 105 which obtains motion feature quantities of the objects on the basis of the obtained motion lines; and a crowd density acquiring unit 107. The arithmetic logic unit 108 is characterized in that it obtains a first estimated density of the objects on the basis of the obtained image feature quantities and the stored relationships between the image feature quantities and the object density, and obtains a second estimated density of the objects on the basis of the obtained motion feature quantities and the stored relationships between the motion feature quantities and the object density.

12 Claims, 9 Drawing Sheets

(52) U.S. Cl.
CPC ............... *G06T 2207/30232* (2013.01); *G06T 2207/30242* (2013.01)

(58) Field of Classification Search
CPC .. G06T 7/246; G06T 1/00; G06T 7/20; G06T 7/60; G06Q 30/02; G08G 1/01; H04N 7/18
See application file for complete search history.

(56) References Cited

U.S. PATENT DOCUMENTS

| | | | | |
|---|---|---|---|---|
| 2011/0115920 | A1* | 5/2011 | Wang | G06K 9/00778 348/169 |
| 2014/0072170 | A1* | 3/2014 | Zhang | G06K 9/00369 382/103 |
| 2014/0372348 | A1* | 12/2014 | Lehmann | G06K 9/6265 706/12 |
| 2016/0133025 | A1* | 5/2016 | Wang | G06K 9/00778 348/135 |
| 2016/0267330 | A1* | 9/2016 | Oami | G06T 7/20 |

FOREIGN PATENT DOCUMENTS

| | | |
|---|---|---|
| JP | 2009-181307 A | 8/2009 |
| JP | 2010-117216 A | 5/2010 |
| JP | 2014-6586 A | 1/2014 |

OTHER PUBLICATIONS

Japanese-language Written Opinion (PCT/ISA/237) issued in PCT Application No. PCT/JP2015/085618 dated Mar. 8, 2016 (Five (5) pages).

Krausz, B., et al., "Analyzing Pedestrian Behavior in Crowds for Automatic Detection of Congestions," 2011 IEEE International Conference on Computer Vision Workshops on Nov. 6-13, 2011, pp. 144-149 (Six (6) pages).

\* cited by examiner

| | CROWD DENSITY ESTIMATION VALUE BY IMAGE FEATURE QUANTITY (FIRST CROWD DENSITY ESTIMATION VALUE) | CROWD DENSITY ESTIMATION VALUE BY MOTION FEATURE QUANTITY (SECOND CROWD DENSITY ESTIMATION VALUE) |
|---|---|---|
| IMAGE 1107 | 2.38 | 3.38 |
| IMAGE 1507 | 0.34 | 2.63 |

| | IMAGE 501 | IMAGE 502 | INCREASING RATE (%) OF A→B |
|---|---|---|---|
| IMAGE FEATURE QUANTITY | 3939 | 4364 | 10.8 |
| CROWD DENSITY | 5 | 9 | 80.0 |

| MOTION LINE ID | TIME t | x COORDINATE | y COORDINATE | DISTANCE TO COORDINATES AT PREVIOUS TIME | TOTAL DISTANCE OF MOTION LINE | DISTANCE FROM START POINT TO END POINT OF MOTION LINE | SWAYING DEGREE | |
|---|---|---|---|---|---|---|---|---|
| 1 | 1 | 178 | 110 | – | – | – | – | 1209 |
| 1 | 2 | 156 | 100 | 24.2 | 24.2 | 24.2 | 1.00 | 1210 |
| 1 | 3 | 168 | 99 | 12.0 | 36.2 | 14.9 | 2.44 | 1211 |
| 1 | 4 | 167 | 88 | 11.0 | 47.3 | 24.6 | 1.92 | 1212 |
| 1 | 5 | 194 | 86 | 27.1 | 74.3 | 28.8 | 2.58 | 1213 |
| 1 | 6 | 203 | 77 | | | | | 1214 |
| 2 | 1 | 75 | 145 | – | – | – | – | 1215 |
| 2 | 2 | 83 | 128 | 18.8 | 18.8 | 18.8 | 1.00 | 1216 |
| 2 | 3 | 95 | 150 | 25.1 | 43.8 | 20.6 | 2.13 | 1217 |
| 2 | 4 | 105 | 125 | 26.9 | 70.8 | 36.1 | 1.96 | 1218 |
| 2 | 5 | 115 | 140 | 18.0 | 88.8 | 40.3 | 2.20 | 1219 |
| 2 | 6 | 122 | 130 | | | | | 1220 |

| MOTION LINE ID | TIME t | x COORDINATE | y COORDINATE | DISTANCE TO COORDINATES AT PREVIOUS TIME | TOTAL DISTANCE OF MOTION LINE | DISTANCE FROM START POINT TO END POINT OF MOTION LINE | SWAYING DEGREE |
|---|---|---|---|---|---|---|---|
| 1 | 1 | 178 | 110 | – | – | – | – |
| 1 | 2 | 156 | 100 | 24.2 | 24.2 | 24.2 | 1.00 |
| 1 | 3 | 168 | 99 | 12.0 | 36.2 | 14.9 | 2.44 |
| 1 | 4 | 167 | 88 | 11.0 | 47.3 | 24.6 | 1.92 |
| 1 | 5 | 194 | 86 | 27.1 | 74.3 | 28.8 | 2.58 |
| 1 | 6 | 203 | 77 | 12.7 | 87.1 | 41.4 | 2.10 ~1401 |
| 2 | 1 | 75 | 145 | – | – | – | – |
| 2 | 2 | 83 | 128 | 18.8 | 18.8 | 18.8 | 1.00 |
| 2 | 3 | 95 | 150 | 25.1 | 43.8 | 20.6 | 2.13 |
| 2 | 4 | 105 | 125 | 26.9 | 70.8 | 36.1 | 1.96 |
| 2 | 5 | 115 | 140 | 18.0 | 88.8 | 40.3 | 2.20 |
| 2 | 6 | 122 | 130 | 12.2 | 101.0 | 49.3 | 2.05 ~1402 |

| MOTION LINE ID | TIME | X COORDINATE | y COORDINATE | DISTANCE TO COORDINATES AT PREVIOUS TIME | TOTAL DISTANCE OF MOTION LINE | DISTANCE FROM START POINT TO END POINT OF MOTION LINE | SWAYING DEGREE | |
|---|---|---|---|---|---|---|---|---|
| 1 | 1 | 171 | 112 | — | — | — | — | 1601 |
| 1 | 2 | 192 | 106 | 21.8 | 21.8 | 21.8 | 1.00 | 1602 |
| 1 | 3 | 209 | 99 | 18.4 | 40.2 | 40.2 | 1.00 | 1603 |
| 1 | 4 | 221 | 93 | 13.4 | 53.6 | 53.5 | 1.00 | 1604 |
| 1 | 5 | 231 | 87 | 11.7 | 65.3 | 65.0 | 1.00 | 1605 |
| 1 | 6 | 246 | 82 | 15.8 | 81.1 | 80.8 | 1.00 | 1606 |
| 2 | 1 | 64 | 145 | — | — | — | — | 1607 |
| 2 | 2 | 69 | 161 | 16.8 | 16.8 | 16.8 | 1.00 | 1608 |
| 2 | 3 | 92 | 166 | 23.5 | 40.3 | 35.0 | 1.15 | 1609 |
| 2 | 4 | 101 | 169 | 9.5 | 49.8 | 44.1 | 1.13 | 1610 |
| 2 | 5 | 130 | 173 | 29.3 | 79.1 | 71.7 | 1.10 | 1611 |
| 2 | 6 | 150 | 173 | 20.0 | 99.1 | 90.4 | 1.10 | 1612 |

| | CROWD DENSITY ESTIMATION VALUE BY IMAGE FEATURE QUANTITY (FIRST CROWD DENSITY ESTIMATION VALUE) | CROWD DENSITY ESTIMATION VALUE BY MOTION FEATURE QUANTITY (SECOND CROWD DENSITY ESTIMATION VALUE) | RESULT OF DETERMINING CROWD DENSITY |
|---|---|---|---|
| IMAGE 1107 | 2.38 | 3.38 | 3.38 |
| IMAGE 1507 | 0.34 | 2.63 | 0.34 |

CROWD MONITORING SYSTEM

TECHNICAL FIELD

The present invention relates to a system which estimates a density of a crowd from a video.

BACKGROUND ART

As a social situation such as security is getting worsen, needs for grasping a congestion degree of a crowd from a video of a monitoring camera are increased for the purpose of safety ensuring and congestion reducing. In particular, there is a need to detect an urgent congestion as much as movement is restricted in order to secure safety of the crowd such as a station platform. In addition, there is a need to display a congested situation in quantification using a "crowd density" (the number of persons per unit area).

As a method of estimating the crowd density in quantification, PTL 1 discloses a technique of calculating a congestion degree from a relation between a feature quantity such as the number of corners and an edge quantity in an image and the number of persons.

NPL 1 discloses a phenomenon that a magnitude of a horizontal swaying is increased at the time of walking as the crowd density is increased. In addition, there is disclosed a description about a histogram which is an index of the congested situation using the phenomenon.

CITATION LIST

Patent Literature

PTL 1: JP 2009-181307 A

Non Patent Literature

NPL 1: "Analyzing Pedestrian Behavior in Crowds for Automatic Detection of Congestions", Computer Vision Workshops (ICCV Workshops), 2011 IEEE International Conference on 6-13 Nov. 2011, pp 144-149

SUMMARY OF INVENTION

Technical Problem

Herein, for example, in a congested situation such as a case where a density is increased and thus only part of a body can be recognized from the image, the feature quantity such as the number of corners and the edge quantity in the image less varies. Therefore, it is hard to secure the accuracy in estimation of the number of persons. PTL 1 discloses a method of estimating the number of persons from a correlation between the number of corners and the number of persons as "degree of disorder". However, it fails in considering a method of estimating the number of persons in a case where the density is high to restrict such a movement.

In addition, in NPL 1, an optical flow obtained at a high density of the crowd in the video is used, and it is detected whether the optical flow is bisymmetrical, so that the congestion degree is obtained. In such a method, it is possible to detect an event that the horizontal swaying phenomenon distinctively occurs, but it is hard to quantify a degree that a magnitude of the horizontal swaying is gradually increased similarly to the density of the crowd. In addition, in a case where the crowd advances in a direction perpendicular to the optical axis of a camera, the resolution of the horizontal swaying becomes small. Therefore, the congested situation may be not detected in a structure such as a monocular camera, and thus a high accurate camera is used so as to undesirably cause an increase in cost.

The invention is to provide a crowd monitoring system which can measure a crowd density in quantification by a simple configuration even in a congested situation in which the crowd is dense as high as the movement is restricted.

Solution to Problem

According to an aspect of the invention to solve to the above problems, there is provided a crowd monitoring system according to an embodiment which includes an image acquiring unit that acquires a plurality of images, an image feature quantity acquiring unit that obtains an image feature quantity of the object in the acquired image, a motion line acquiring unit that obtains a motion line of the object in the acquired image, a motion feature quantity acquiring unit that obtains a motion feature quantity of the object on the basis of the obtained motion line, a storage unit that stores information of a relation between the image feature quantity and the density of the object acquired in advance, and a relation between the motion feature quantity and the density of the object acquired in advance, and a arithmetic logic unit. The arithmetic logic unit obtains a first density estimation value of the object on the basis of the obtained image feature quantity and a relation between the stored image feature quantity and the density of the object, and a second density estimation value of the object on the basis of the obtained motion feature quantity and a relation between the stored motion feature quantity and the density of the object.

Advantageous Effects of Invention

According to the invention, an abnormal congestion of a high density can be quantified as "crowd density" by a simple configuration using a monocular camera, so that the invention can contribute to safety securing and congestion reducing of the crowd such as a station platform.

DESCRIPTION OF EMBODIMENTS

Hereinafter, embodiments will be described with reference to the drawings.

First Embodiment

<Basic Configuration>

Figure 1:
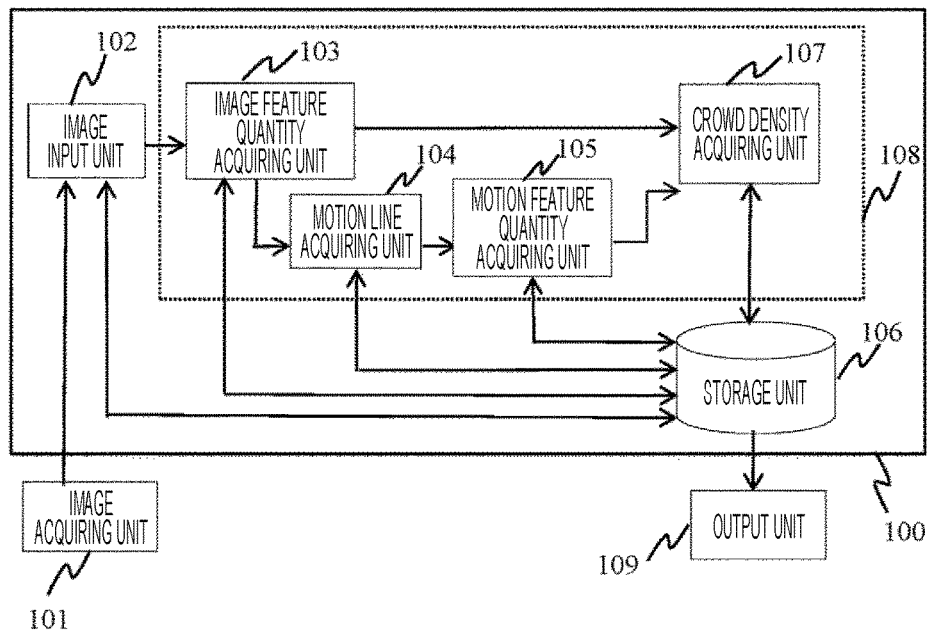
FIG. 1 is a block diagram illustrating a basic configuration of a crowd monitoring system according to this embodiment.

FIG. 1 is a block diagram illustrating a basic configuration of a crowd monitoring system according to this embodiment.

As illustrated in this drawing, a crowd monitoring system 100 according to this embodiment mainly includes an image acquiring unit 101, an image input unit 102, a feature quantity acquiring unit 103, a motion line acquiring unit 104, a motion feature quantity acquiring unit 105, a storage unit 106, a crowd density acquiring unit 107, and an output unit 109. In this embodiment, the description will be given about a method in which a feature quantity of an object in each of a plurality of acquired crowd images is obtained, a motion line is obtained from a trace of a matched feature quantity in a plurality of image so as to acquire a motion feature quantity, and a density (hereinafter, this may be referred to as crowd density) of the object in the acquired image is obtained from a relation between the feature quantity and the density stored in advance.

Hereinafter, the respective configurations of the crowd monitoring system 100 according to this embodiment will be described. Further, herein, the acquired image is assumed as an image captured by an image acquiring device (corresponding to the image acquiring unit 101) such as a camera which is provided in a place (for example, a station) where the crowds are gathered.

The image acquiring unit 101 is a device which captures an object to acquire an image such as a monitoring camera as described above.

The image input unit 102 is a unit which inputs the image acquired by the image acquiring unit 101 into a system. Herein, the image input unit 102 may directly input the image from the image acquiring unit 101, or may input data temporally stored in a storage unit (not illustrated) among the data acquired by the image acquiring unit 101.

The image feature quantity acquiring unit 103 is a unit which acquires the feature quantity of the object in the image input from the image input unit 102. Herein, the details of a method of acquiring the feature quantity of the image will be described below using FIG. 2.

The motion line acquiring unit 104 tracks the object by relating feature points between the images which are input from the image acquiring unit 101 at different capturing timings to obtain the motion line. Herein, the details of a method of acquiring the motion line will be described below using FIG. 8.

The motion feature quantity acquiring unit 105 performs a process of analyzing motion line information obtained by the motion line acquiring unit 104 to acquire the feature quantity (hereinafter, this may be referred to as a motion feature quantity) which is obtained from the motion. Herein, a method of acquiring the motion feature quantity will be described below using FIG. 10.

The crowd density acquiring unit 107 performs a process of acquiring a density of the crowd (object) on the basis of information of an image feature quantity obtained by the image feature quantity acquiring unit 103 and the motion feature quantity obtained by the motion feature quantity acquiring unit 105. Herein, the details of a method of acquiring the crowd density will be described below using FIGS. 2 and 18.

Further, the image feature quantity acquiring unit 103, the motion line acquiring unit 104, the motion feature quantity acquiring unit 105, and the crowd density acquiring unit 107 described above are collectively referred to as an arithmetic logic unit 108. The arithmetic logic unit 108 also includes arithmetic logic means other than the respective configurations described above.

The data of the information obtained from the above configurations is stored in the storage unit 106. In addition, for example, the data may be output to the outside by the output unit 109. Herein, a display device may be included in the output unit 109.

Next, the respective processes in the arithmetic logic unit 108 will be described.

<Acquisition of Image Feature Quantity>

Figure 2:
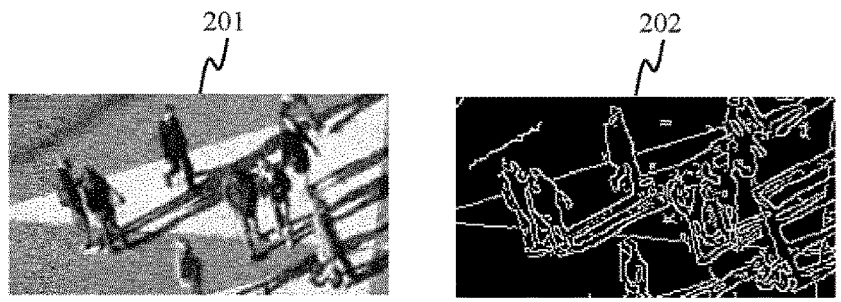
FIG. 2 is a diagram for describing a technique of extracting an edge from a captured crowd image according to this embodiment.

Herein, a method of acquiring the feature quantity of an image will be described in a case where an edge is used as the feature quantity using FIG. 2. This process is performed by the image feature quantity acquiring unit 103. Herein, FIG. 2 is a diagram for describing a technique of extracting an edge as the feature quantity from an image in which the crowd is captured as an object according to this embodiment.

An edge image 202 is a result of extracting a pixel having a large brightness gradient from an image 201 input by the image input unit 102 using a member such as an edge filter (not illustrated). The details of the method of extracting the edge are disclosed in JP 2014-110028 A.

<Estimation of Crowd Density Based on Image Feature Quantity>

The description will be given about a method of estimating a density of the crowd from the feature quantity of the image obtained as described above.

As illustrated in the edge image 202 in FIG. 2, the extracted edge represents an outline of the region occupied by people, so that an edge quantity also tends to increase and decrease according to the increase/decrease of the number of persons. Then, the density of the crowd can be estimated from the edge quantity in a newly input image using a property that the edge quantity (the feature quantity) on the image is correlated to the crowd density.

Further, this embodiment is described about a case where the edge quantity is used as the feature quantity. However, as another example, an area of the region of the people occupied in the image or the number of corners extracted from the image may be used as the feature quantity.

<Acquisition of Motion Line>

Next, a method of acquiring the motion line will be described using FIG. 8. This process is performed by the motion line acquiring unit 104. Specifically, a process of obtaining an optical flow between the images having different capturing timings is performed continuously as time goes by so as to obtain a continuous optical flow, so that the continuous optical flow can be acquired as the motion line. Herein, a method of obtaining the optical flow is disclosed in JP 2014-182759 A.

In this embodiment, the description will be given about a method of obtaining the optical flow. However, any other methods may be used as long as a feature of the motion of the crowd can be obtained.

Figure 8:
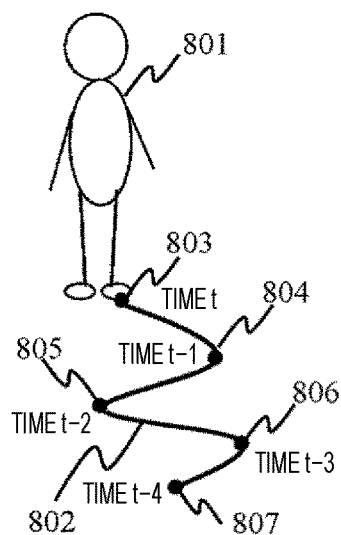
FIG. 8 is a diagram for describing a technique of acquiring a motion line according to this embodiment.

FIG. 8 is a diagram for describing a technique of acquiring the motion line using the optical flow. This drawing illustrates a motion line 802 obtained by tracking the feature point of a person 801 at a point of the latest time t (current time). The motion line 802 in this drawing is a result obtained by tracking the feature points using the different images captured at four points of time in the past going back from time t.

A tracking point 803 illustrates a position of the person 801 at the current time t, a tracking point 804 is a position of the person 801 at time t−1 before 1 hour from time t, a tracking point 805 is a position of the person 801 at time t−2 before 2 hours from time t, a tracking point 806 is a position of the person 801 at time t−3 before 3 hours from time t, and a tracking point 807 is a position of the person 801 at time t−4 before 4 hours from time t.

Figures 11, 12:
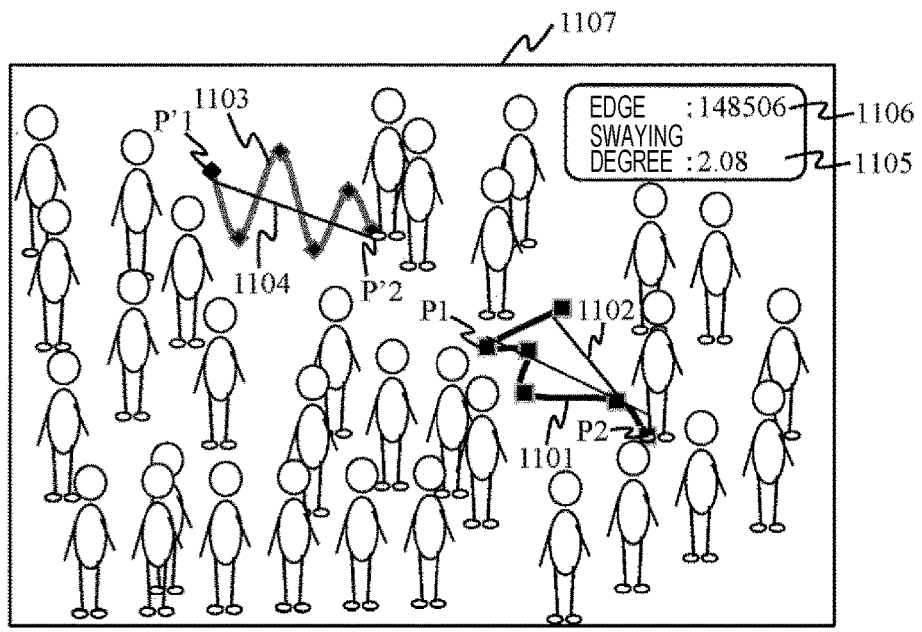
FIG. 11 is a diagram for describing a technique of obtaining the motion feature quantity on the basis of the motion line in a congested crowd image according to this embodiment.
FIG. 12 is a diagram illustrating a table listing coordinate information of the motion line according to this embodiment.

At time t, the past motion line 802 is displayed by continuously connecting the positions at the past times as illustrated in FIG. 8, so that it is possible to grasp the motion of the person in the target crowd. The motion line information obtained as described above can be stored as a table in which IDs of the motion lines are associated with time together with various identification information in the storage unit 106 as illustrated in FIG. 12.

Figure 9:
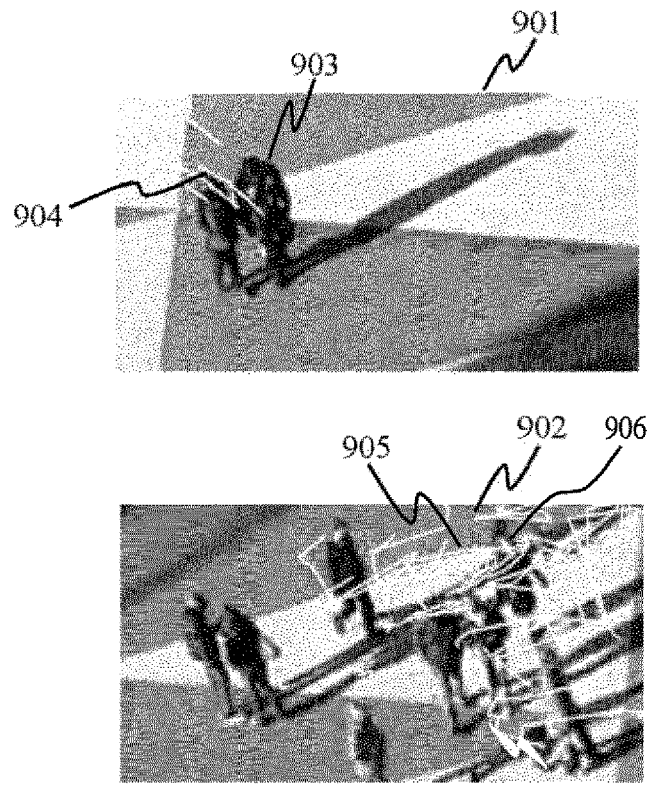
FIG. 9 is a diagram illustrating an example of obtaining motion lines of a plurality of persons in the crowd in an actual image according to this embodiment.

Further, the motion line has been described using tracked one feature point with respect to the person 801 in the above description. Otherwise, the motion lines can be obtained by detecting a number of feature points with respect to a plurality of persons in the crowd in the entire screen and tracking a plurality of feature points. FIG. 9 illustrates an example of obtaining the motion lines of the plurality of persons in the crowd in an actual image. Motion lines 904 and 905 on images 901 and 902 are obtained according to the above method. Herein, the image 901 of FIG. 9 is an example of acquiring the motion line with respect to a video of the crowd at the off-hours in which the motion line 904 is acquired by tracking the feature point on a person 903. In addition, the image 902 is an example of acquiring the motion line with respect to a video of the crowd in a congested situation compared to that at the off-hours of the image 901 in which the motion line 905 is acquired by tracking the feature point on the person 906.

<Acquisition of Motion Feature Quantity>

Next, the description will be given about a method of acquiring the motion feature quantity using the motion line information obtained by the above method. This process is performed by the motion feature quantity acquiring unit 105. Herein, in FIG. 9 described above, it can be seen that the person 903 in the crowd moves straightly in an advancing direction at the off-hours as the image 901 on the basis of the motion line 904. On the contrary, at the time of congestion as the image 902, it can be seen that the person 906 in the crowd meanders around other than the advancing direction and does not move straightly in the advancing direction on the basis of the motion line 905. In this example, it can be seen that a horizontal swaying in the right and left direction with respect to the advancing direction becomes large as the crowd density is increased and a walking speed is lowered.

Figure 10:
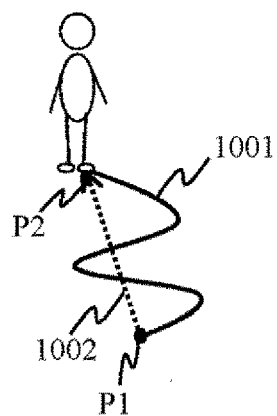
FIG. 10 is a diagram for describing a technique of obtaining a motion feature quantity on the basis of the motion line according to this embodiment.

In the motion feature quantity acquiring unit 105, the motion feature quantity of the horizontal swaying in the right and left direction is obtained by the process using the motion line. Herein, a method of obtaining the motion feature quantity will be described using FIGS. 10, 11, and 12. In FIG. 10, a motion line 1001 is a motion line obtained by the motion of a person, and a start point P1 and an end point P2 of the motion line 1001 is connected to obtain a straight line 1002. A value obtained by dividing the length of the straight line 1002 by the length of the motion line 1001 is set to a swaying degree which is the motion feature quantity of the motion line 1001, and used as an index indicating a magnitude of the horizontal swaying. Further, while the description herein has been given about a case where the swaying degree is used as an example of the motion feature quantity, the motion feature quantity is not limited thereto, and other indexes may be applied.

FIG. 11 is a diagram for describing a technique of obtaining the motion feature quantity on the basis of the motion line in the congested crowd image. The motion lines 1101 and 1103 in the image are obtained from the crowd image according to the above method. In practice, a number of motion lines are obtained and processed, but herein the two motion lines are illustrated for the sake of simplicity. Then, straight lines 1102 and 1104 are obtained by connecting start points P1 and P'1 and end points P2 and P'2 of the motion lines 1101 and 1103 respectively. On the right upper side of an image 1107 of FIG. 11, there are displayed a swaying degree 1105 obtained by dividing the length of the motion lines 1101 and 1103 by the length of the corresponding straight lines 1102 and 1104 by the motion feature quantity acquiring unit 105, and an edge value 1106 which is the feature quantity obtained by the feature quantity acquiring unit 103.

FIG. 12 is a diagram illustrating a table which is stored in the storage unit 106 and lists the motion line information containing coordinate information of the motion line. In the storage unit 106, as illustrated in this drawing, a history of the coordinates taken for each elapsed time of the motion line until the current time can be stored.

A column 1201 of the table illustrated in FIG. 12 indicates the motion line ID for uniquely specifying the motion line. A column 1202 indicates information of time "t" at which the information of each row is calculated. A column 1203 indicates the x coordinate of the motion line at time t, and a column 1204 indicates the y coordinate of the motion line at time t. A column 1205 indicates a distance to the coordinates at the previous time. For example, the value of "distance to the coordinates at the previous time" stored in a row 12a of the column 1205 is calculated by the following equation on the basis of the values of the x and y coordinates stored in the columns 1203 and 1204 of a row 1209, and the values of the x and y coordinates stored in the columns 1203 and 1204 of a row 1210.

A total distance of the motion line of a column 1206 is a value obtained by accumulating a total distance from a start point of tracking the motion line. Therefore, the value of the column 1205 is obtained by accumulating the distances of the column 1205 up to the corresponding row having the same motion line ID. For example, the total distance of the motion line of a row 1211 is "distance to the coordinates at the previous time" of the column 1205 up to time t="3" of the motion line of a motion line ID of "1". Therefore, the total distance is "36.2" obtained by accumulating the values of the rows 1210 and 1211 of the column 1205.

The "distance from the start point to the end point of the motion line" of a column 1207 is a linear distance connecting the coordinates of the start point of the subject motion line ID and the coordinates at the current time t, and corresponds to the length of the straight line 1002 in FIG. 10 and of the straight lines 1102 and 1104 in FIG. 11.

Xt1: x coordinate of the start point of the motion line
Yt1: y coordinate of the start point of the motion line For example, the "distance from the start point to the endpoint of the motion line" of a row 1212 is "14.9" calculated by Expression 2 on the basis of the values of the x and y coordinates at which time t of a motion line ID of "1" of the row 1209 is "1", and the values of the x and y coordinates of the row 1212.

As described in FIG. 10, the swaying degree of a column 1208 is, for example, obtained by dividing the total length of the motion line 1001 by the distance between the start point and the end point of the motion line 1001 (that is, the length of the straight line 1002). In this drawing, the swaying degree is obtained by dividing "total distance of the motion line" of the column 1206 of the same record by "distance between the start point and the end point of the motion line" of the column 1207.

The swaying degree for each motion line obtained as described above is calculated for all the motion lines in the image, and an average is taken, so that the crowd density can be obtained which is an index of the congestion degree of the crowd of the motion line displayed on the entire image.

Figure 13:
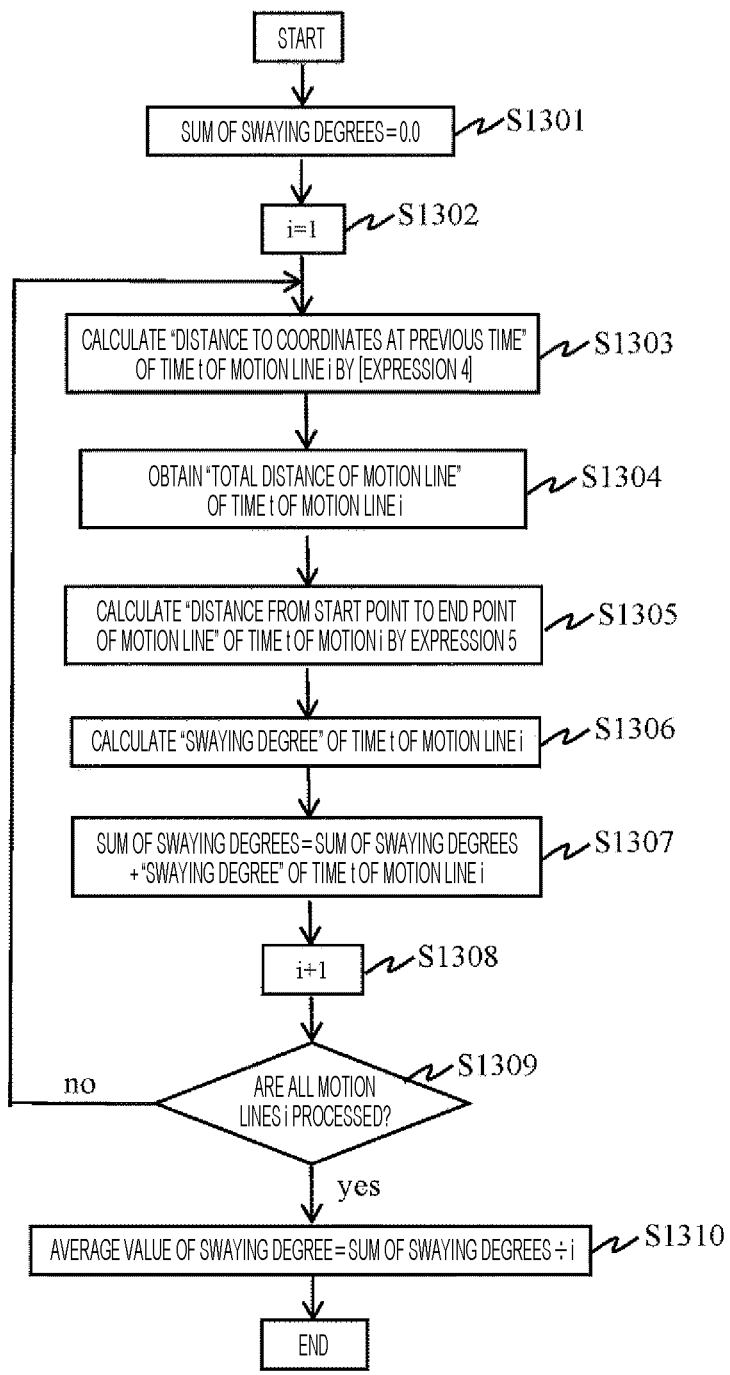
FIG. 13 is a flowchart for describing a process of a motion feature quantity acquiring unit according to this embodiment.

Herein, the process of the motion feature quantity acquiring unit 105 will be described using the flowchart of FIG. 13. This process starts at a time point at which the coordinates of the motion line at the latest time t is obtained by the process of obtaining the motion line in time t by the motion line acquiring unit 104. The following description will be given on the assumption that time t=6, and the coordinates are obtained and stored at time t=6 as illustrated in FIG. 12. The motion feature quantity acquiring unit 105 performs a process of obtaining an average value of the swaying degrees of all the motion lines after obtaining the values of the column 1205, the column 1206, the column 1207, and the column 1208.

In Step 1301, a variable of "sum of the swaying degrees" is initialized to "0.0" (S1301). In Step 1302, a reference counter i of the motion line is initialized to "1" (S1302). Next, in Step 1303, "distance to the coordinates at the previous time" of time t of a motion line i is obtained by the above Expression 1 (S1303). In Step 1304, "total distance of the motion line" of time t of the motion line i is obtained by the above method (S1304). In Step 1305, "distance between the start point and the end point of the motion line" of time t of the motion line i is obtained using the above Expression 2 (S1305). In Step 1306, "swaying degree" of time t of the motion line i is obtained by dividing "total distance of the motion line" obtained in Step 1303 as described above by "distance between the start point and the end point of the motion line" obtained in Step 1304 (S1306). In Step 1307, the swaying degree of time t of the motion line i in Step 1306 is added to the variable of "sum of the swaying degrees" of time t for counting up the swaying degrees of all the motion lines (S1307). At this timing, in Step 1308, the counter 1 of the motion line is increased by "1" (S1308). In Step 1309, it is determined whether all the motion lines i are processed (S1309). As a result, in a case where the process is completed, the procedure proceeds to Step 1310 (S1310). In a case where the process is not completed, the procedure returns to Step 1303, and the process for the next motion line is performed. In Step 1310, "sum of the swaying degree" obtained by the process until Step 1309 is divided by the number of motion lines to obtain an average value of the swaying degree which is obtained from all the motion lines.

Figures 14, 15:
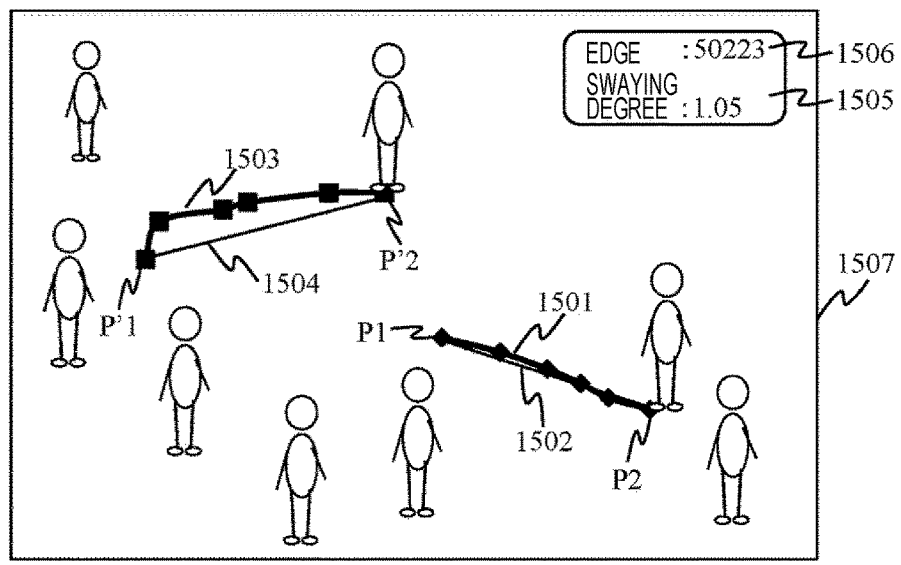
FIG. 14 is a diagram for describing motion line information after acquiring the motion feature quantity according to this embodiment.
FIG. 15 is a diagram for describing a technique of obtaining the motion feature quantity on the basis of the motion line in a crowd image at the off-hours according to this embodiment.

Through the process of the motion feature quantity acquiring unit 105, the values of rows 1214 and 1220 left blank in the table illustrated in FIG. 12 before the acquisition are obtained as illustrated in rows 1401 and 1402 in FIG. 14, and the value of the swaying degree 1105 obtained on the basis of the information of all the motion lines illustrated in FIG. 11 is obtained as "2.08".

Figures 16, 17:
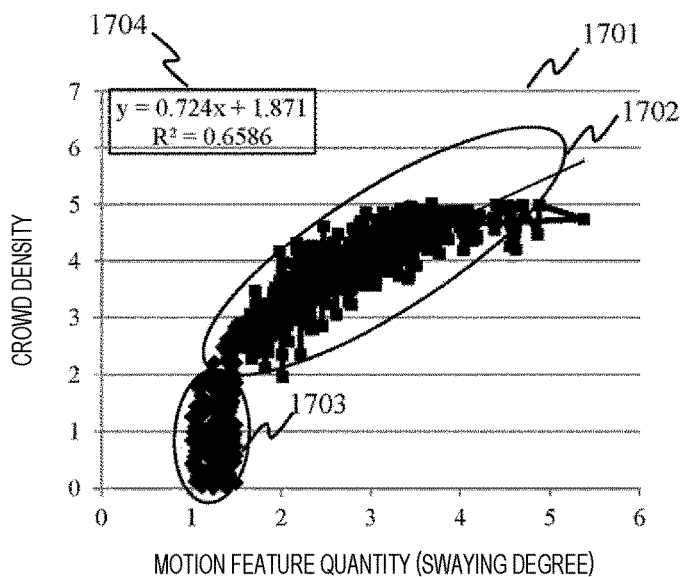
FIG. 16 is a diagram for describing the motion line information according to this embodiment.
FIG. 17 is a graph illustrating a relation between the motion feature quantity and the crowd density according to this embodiment.

In addition, the above example has been described about a case where the swaying degree of the motion line of the crowd is high in a congested situation as illustrated in FIG. 11. On the contrary, a case where the swaying degree of the motion line is low (that is, an example at the off-hours) is illustrated in FIGS. 15 and 16. FIG. 15 illustrates an example of an image of the crowd at the off-hours, and motion lines 1501 and 1503 and straight lines 1502 and 1504 connecting the start points P1 and P'1 and the end points P2 and P'2 of the motion lines.

FIG. 16 is a diagram for describing a technique of obtaining the motion feature quantity on the basis of the motion line in the crowd image at the off-hours according to this embodiment. In FIG. 16, the states of times of the motion line 1501 obtained in FIG. 15 are listed in rows 1601 to 1606, and the states of times of the motion line 1503 are listed in rows 1607 to 1612.

In the example described using FIGS. 11 and 12, the motion lines 1101 and 1103 are swayed from side to side, and thus the lengths of the motion lines 1101 and 1103 are significantly different from the lengths of the straight lines 1102 and 1104 connecting the start points P1 and P'1 and the end points P2 and P'2. The values of the swaying degrees obtained as a result also become large. With this regard, in FIG. 15, traces of the motion lines 1501 and 1503 become straight as they go near to the straight lines 1502 and 1504 connecting the start points P1 and P'1 and the end points P2 and P'2. It can be seen that the values of the obtained swaying degrees go near to "1.0" since the lengths of the motion lines 1501 and 1503 are substantially matched to the lengths of the straight lines 1502 and 1504. On the right upper side of an image 1507 of FIG. 15, a swaying degree 1505 obtained by dividing the length of the motion lines 1501 and 15033 by the length of the corresponding straight lines 1502 and 1504 by the motion feature quantity acquiring unit 105, and an edge value 1506 which is the feature quantity obtained by the image feature quantity acquiring unit 103 are displayed.

<Acquisition of Crowd Density>

Figure 3:
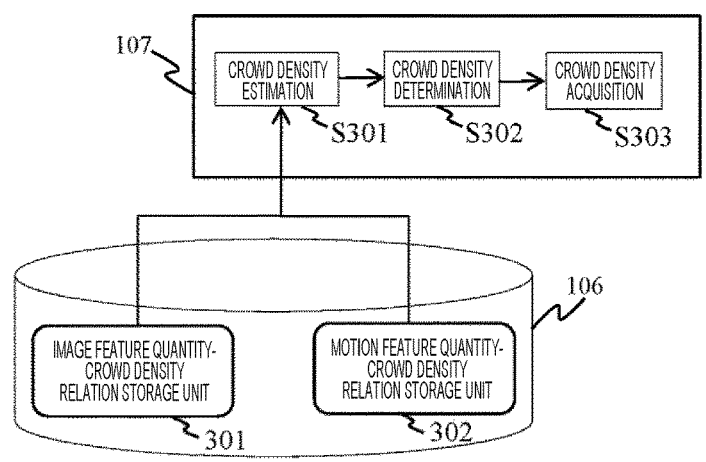
FIG. 3 is a diagram illustrating a motion process of acquiring a crowd density in a crowd density acquiring unit 107 according to this embodiment, and a basic configuration of an image feature quantity-crowd density relation storage unit 301 and a motion feature quantity-crowd density relation storage unit 302 in a storage unit 106.

Next, the description will be given about a method of acquiring the crowd density using the feature quantity and the motion feature quantity of the image obtained by the above method with reference to FIG. 3. This process is mainly performed by the crowd density acquiring unit 107. Herein, FIG. 3 is a diagram illustrating a motion process in which the crowd density is acquired by the crowd density acquiring unit 107 according to this embodiment, and a basic configuration of an image feature quantity-crowd density relation storage unit 301 and a motion feature quantity-crowd density relation storage unit 302 in the storage unit 106 is illustrated.

The crowd density acquiring unit 107 estimates the crowd density in Step 301 on the basis of information of a relation between the feature quantity and the crowd density of the image acquired by the above method which is stored in advance in the image feature quantity-crowd density relation storage unit 301 of the storage unit 106, and a relation between the motion feature quantity and the crowd density acquired by the above method which is stored in advance in the motion feature quantity-crowd density relation storage unit 302 of the storage unit 106 (S301), determines the estimated crowd density in Step 302 (S302), and finally determines a value of the crowd density in Step 303 (S303). Hereinafter, the information and the process will be described below.

<Image Feature Quantity-Crowd Density Relation>

Figure 7:
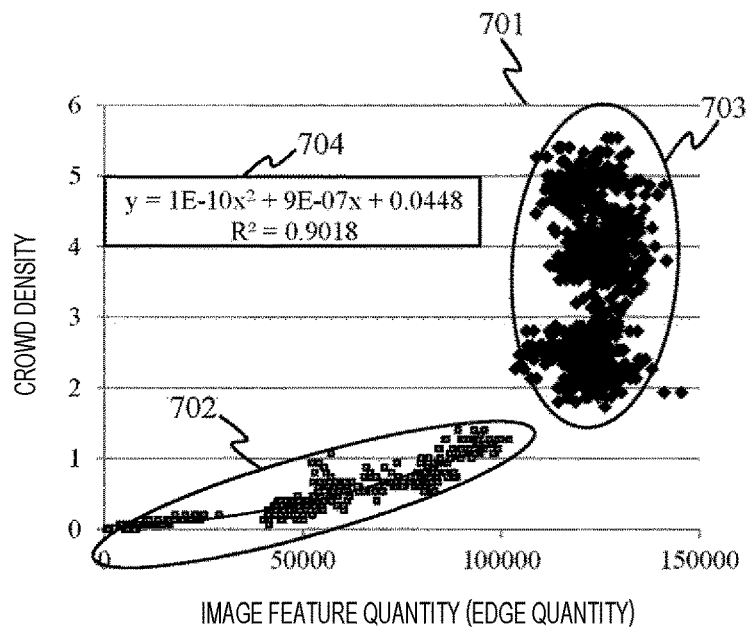
FIG. 7 is a graph for describing a relation between the image feature quantity and the crowd density according to this embodiment.

FIG. 7 is a graph illustrating an image feature quantity-crowd density relation according to this embodiment. The graph 701 is obtained as a scatter map drawing a relation between the image feature quantity and the crowd density, in which the edge quantity (image feature quantity) is extracted from a number of crowd images (monitoring target) captured by a device such as a monitoring camera according to the above method, and the crowd density is obtained from each image. Herein, the crowd density is obtained by manually counting the number of persons in each image and then by simply dividing the number by an area in an experiment.

As can be seen from this drawing, the feature quantity of the image is highly correlated to the crowd density in a region 702 where the crowd density is low, and the feature quantity is saturated in a region 703 where the crowd density is high, so that the crowd density is not possible to be estimated well.

Figure 5:
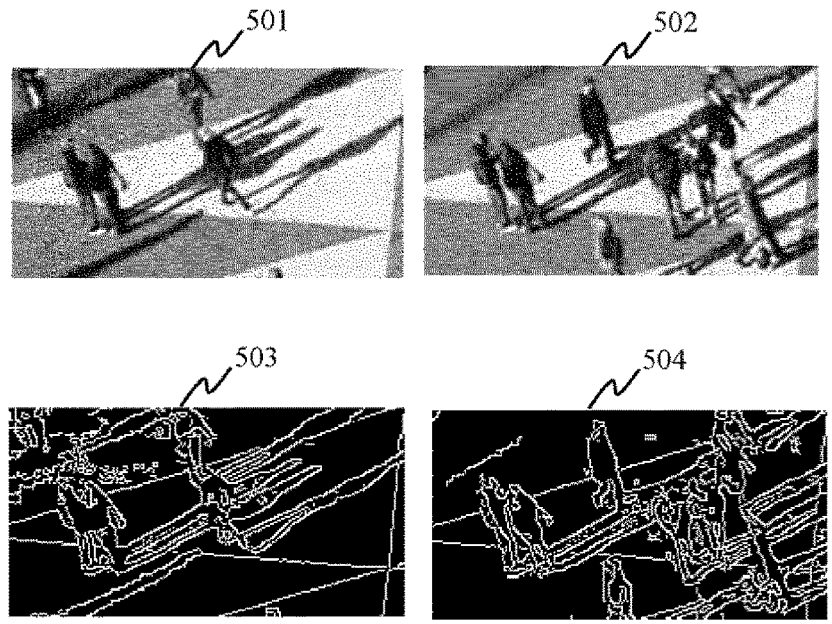
FIG. 5 is a diagram illustrating an example of a crowd image and an edge image extracted from the captured crowd image according to this embodiment.

Such a phenomenon will be described using FIGS. 5 and 6. FIG. 5 is a diagram illustrating an example of a captured crowd image according to this embodiment. Images 501 and 502 are images captured at the same angle of view but at different times. Comparing these both images, it can be seen that the image 502 is congested more than the image 501. Edge images 503 and 504 are images of which the edges are extracted from the images 501 and 502.

Figure 6:
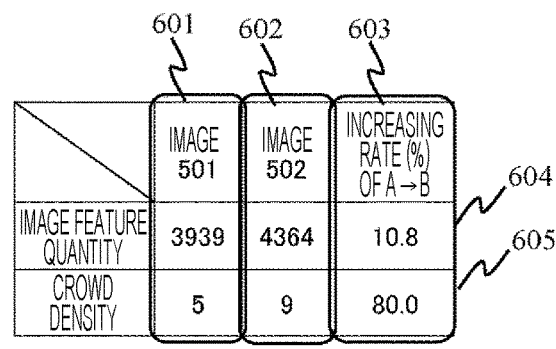
FIG. 6 is a diagram illustrating values of the image feature quantity and the crowd density of images 501 and 502 according to this embodiment.

FIG. 6 illustrates values of the image feature quantity and the crowd density of the images 501 and 502 according to this embodiment. Herein, the feature quantity is the number of pixels of the extracted edge. The columns 601 and 602 of FIG. 6 illustrate information of the images 501 and 502. A row 604 indicates the feature quantity of the image, and a row 605 indicates the crowd density this is the number of persons per unit area. Herein, comparing the feature quantities of the images 501 and 502, the image 501 has a feature quantity of "3939", and the image 52 has a feature quantity of "4364". An increasing rate of the feature quantity calculated by the following equation is 10.8% as denoted in a row 603.

Increasing rate of feature quantity (%)=((Feature quantity of image 502−Feature quantity of image 501)/Feature quantity of image 502)*100 [Expression 3]

With this regard, comparing the crowd densities in the images 501 and 502, the image 501 has "5" persons, and the image 502 has "9" persons. An increasing rate of the number of persons calculated by the following equation is 80.0% as denoted in the row 603.

Increasing rate of persons (%)=((Number of persons in image 502−Number of persons in image 501)//Number of persons in image 502)*100 [Expression 4]

In this way, in a case where a large degree of persons is overlapped in the image and the congestion is highly dense so that only part of the body can be seen, the variation of the feature quantity also becomes small. Therefore, it is difficult to secure an accuracy in estimation of the number of persons.

<Estimation of First Crowd Density>

Such a situation described above is reflected to obtain a regression formula 704 in FIG. 7 on the basis of a distribution of the image feature quantity and the crowd density. The regression formula 704 is stored in advance as reference data of a relation between the image feature quantity and the crowd density. It is possible to obtain an estimation value of a first crowd density by the image feature quantity obtained from an actual image on the basis of the relation.

A method of determining the first crowd density will be described using FIGS. 11 and 15. In the image of FIG. 11, since the number of edges 1106 (image feature quantity) obtained by the image feature quantity acquiring unit 103 is "148506", the regression formula 704 is read out from the image feature quantity-crowd density relation illustrated in the graph of FIG. 7 which is the reference data stored in advance as described above, and "148506" is substituted into an image feature quantity x to obtain a crowd density of "2.38". Similarly, in the image of FIG. 15, since the number of edges 1506 (image feature quantity) obtained by the image feature quantity acquiring unit 103 is "50223", the regression formula 704 is read out from the image feature quantity-crowd density relation illustrated in the graph of FIG. 7 which is the reference data stored in advance as described above, and "50223" is substituted into the image feature quantity x to obtain a crowd density of "0.34".

Figure 4:
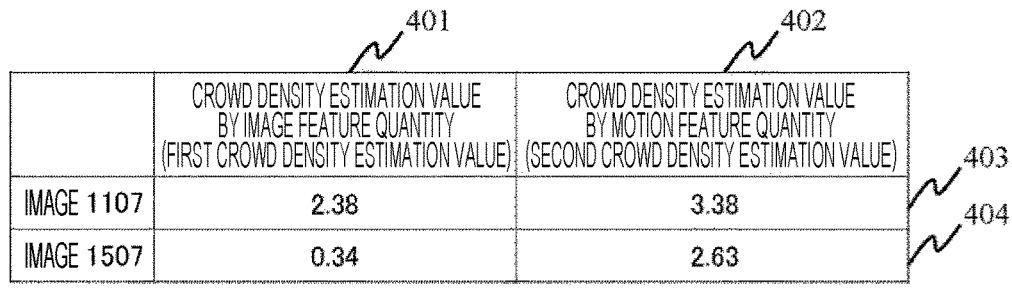
FIG. 4 is a diagram illustrating a result calculated by a density estimating unit.

A result of the image feature quantity obtained as described above is illustrated in a row 401 of FIG. 4.

<Motion Feature Quantity-Crowd Density Relation>

FIG. 17 is a graph illustrating a motion feature quantity-crowd density relation according to this embodiment. The graph is obtained as a scatter map drawing a relation between the image feature quantity and the crowd density, in which the swaying degree (motion feature quantity) is extracted from a number of crowd images (monitoring target) captured by a device such as a monitoring camera according to the above method, and the crowd density is obtained from each image. Herein, the crowd density is obtained by manually counting the number of persons in each image and then by simply dividing the number by an area in an experiment.

As can be seen from this drawing, the motion feature quantity is saturated in a region 1703 where the crowd density is low, so that the crowd density is not possible to be estimated well. When the crowd density is decreased and a degree of free moving is increased, the right and left movement at the time of congestion becomes small. On the other hand, it can be seen that the motion feature quantity and the crowd density have a high correlation therebetween in a region 1702 where the crowd density is high. This fact is also consistent with the correlation between a degree of the horizontal swaying and the object disclosed in NPL 1, and the correlation between the speed of the object and the crowd density. Herein, the "magnitude of the horizontal swaying" and the "speed" have a linear relation such that the "magnitude of the horizontal swaying" is decreased as the "speed" is increased. In addition, the "speed" and the "crowd density" have a relation such that the "crowd density" is increased to form a smooth curve as the "speed" is decreased.

<Estimation of Second Crowd Density>

Such a situation described above is reflected to obtain a regression formula 1704 in FIG. 17 on the basis of a distribution of the motion feature quantity and the crowd density. The regression formula 1704 is stored in advance as reference data of a relation between the motion feature quantity and the crowd density. It is possible to obtain an estimation value of a second crowd density by the motion feature quantity obtained from an actual image on the basis of the relation.

A method of determining the second crowd density will be described using FIGS. 11 and 15. In the image of FIG. 11, since the swaying degree 1105 (motion feature quantity) obtained by the motion feature quantity acquiring unit 105 is "2.08", the regression formula 1704 is read out from the motion feature quantity-crowd density relation illustrated in the graph of FIG. 17 which is the reference data stored in advance as described above, and "2.08" is substituted into an motion feature quantity x to obtain a crowd density of "3.38". Similarly, in the image of FIG. 15, since the swaying degree 1505 (motion feature quantity) obtained by the motion feature quantity acquiring unit 105 is "1.05", the regression formula 1704 is read out from the motion feature quantity-crowd density relation illustrated in the graph of FIG. 17 which is the reference data stored in advance as described above, and "1.05" is substituted into the motion feature quantity x to obtain a crowd density of "2.63".

A result of the motion feature quantity obtained as described above is illustrated in a row 402 of FIG. 18.

<Determination on Crowd Density>

As described above, the estimation value of the first crowd density is obtained from the image feature quantity-crowd density relation, and the estimation value of the second crowd density is obtained from the motion feature quantity-crowd density relation. Herein, as described using FIGS. 7 and 17, the crowd density is hard to uniquely obtained on the basis of individual relation because there are a region indicating a high correlation between the image feature quantity and the motion feature quantity and, on the contrary, a region which is hard to make an estimation.

Therefore, in this embodiment, in a case where the crowd density is lower than a certain threshold with respect to two kinds of feature quantities of the image feature quantity and the motion feature quantity, it is determined that the crowd density is set using the image feature quantity. Ina case where the crowd density is equal to or more than the threshold, it is determined that the crowd density is set using the motion feature quantity. In this way, the crowd density is comprehensively determined on the basis of two kinds of crowd densities, so that it is possible to obtain a highly reliable result regardless of the magnitude of the crowd (object).

A method of determining the crowd density will be described using FIGS. 11 and 15. In the image of FIG. 11, an edge feature quantity 1106 obtained in the process of the image feature quantity acquiring unit 103 is "148506", and the swaying degree 1105 (motion feature quantity) acquired by the motion feature quantity acquiring unit 105 is "2.08". In the image of FIG. 15, an edge feature quantity 1506 obtained in the process of the image feature quantity acquiring unit 103 is "50223", and the swaying degree 1505 (motion feature quantity) acquired by the motion feature quantity acquiring unit 105 is "1.05".

Then, the crowd density obtained from the image feature quantity is employed in a region where the crowd density is low, and the crowd density obtained from the motion feature quantity is employed in a region where the crowd density is high.

Specifically, a threshold is set in advance, and in a case where the calculated density is equal to or less than the threshold, the crowd density obtained from the image feature quantity is employed. In a case where the calculated density is larger than the threshold, the crowd density obtained from the motion feature quantity is employed.

Figures 18, 19:
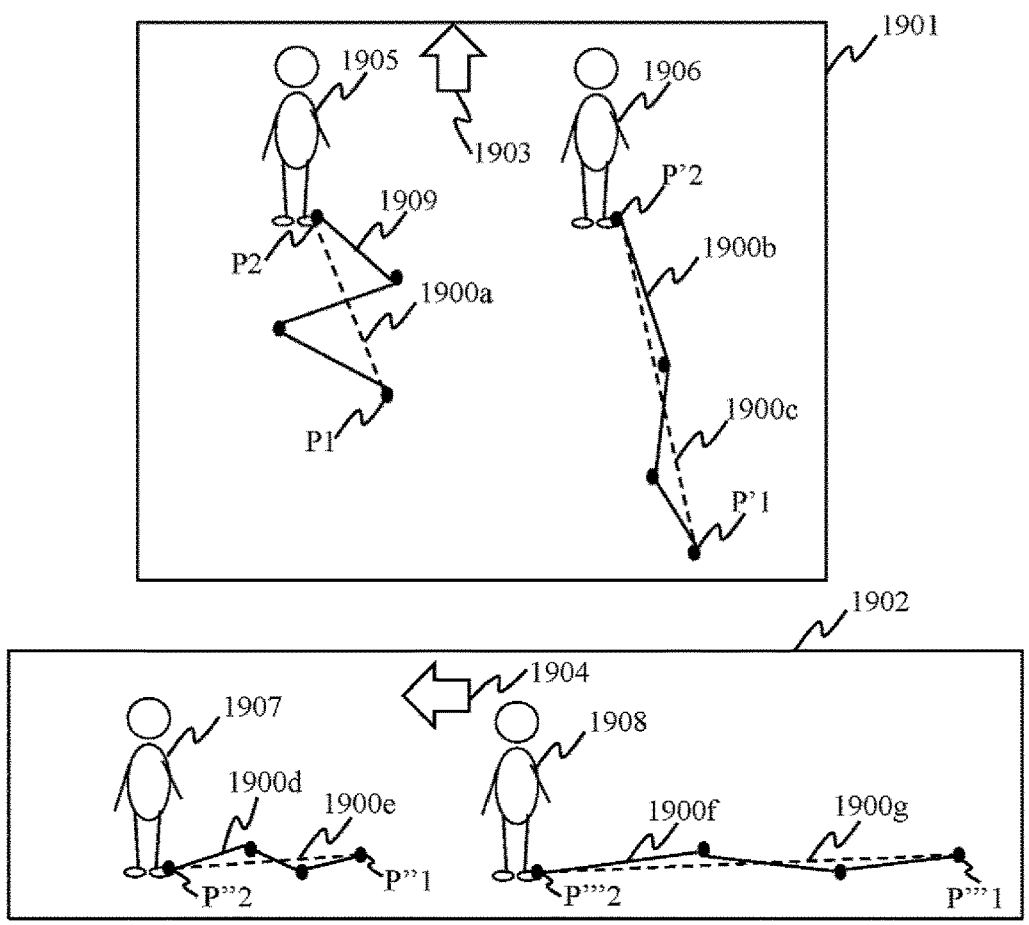
FIG. 18 is a diagram illustrating a result of a crowd density determining process according to this embodiment.
FIG. 19 is a diagram for describing an effect when a distance between a start point and an end point of the motion line is used to acquire the motion feature quantity according to this embodiment.

For example, when the threshold is set to a density of "2.0", the crowd density obtained from the image feature quantity of the image 1107 illustrated in a row 403 is "2.38" as illustrated in FIG. 18. Since the crowd density is larger than the threshold of 2.0, a density of "3.38" obtained from the motion feature quantity illustrated in the row 402 is employed. In addition, the crowd density obtained from the image feature quantity of the image 1507 illustrated in a row 404 is "0.34". Since the threshold is equal to or less than the threshold of 2.0, a crowd density of "0.34" obtained from the image feature quantity illustrated in the row 401 is employed. The crowd density obtained as a result of a crowd density determining process is illustrated in a row 1801 of FIG. 18. Herein, the threshold used to determine whether the crowd density of a region is low or high can be properly adjusted.

Further, in the above description, the image feature quantity and the motion feature quantity are obtained, and then one of the estimation value of the first crowd density and the estimation value of the second crowd density is determined to be employed for the crowd density by the crowd density acquiring unit 107. After the image feature quantity is acquired and before the motion feature quantity is acquired by the image feature quantity acquiring unit 103, the crowd density may be obtained from the image feature quantity. With such a configuration, in a case where the crowd density obtained from the image feature quantity is equal to or less that the threshold, the crowd density obtained by the image feature quantity is employed. Therefore, the processes of the motion line acquiring unit 104 and the motion feature quantity acquiring unit 105 may be skipped. In this case, a throughput of the processes may be improved.

In addition, in the above process of determining the crowd density, the crowd density to be employed may be obtained by a weight average of two kinds of crowd densities in a predetermined range before and after the threshold not by switching any one of the crowd densities of the rows 401 and 402 of FIG. 18 on the basis of the threshold. The weight depending on the image feature quantity is set to be slightly decreased at the boundary of the threshold, and the weight depending on the motion feature quantity is set to be slightly increased, so that it is possible to prevent that a value caused the switching at the threshold steeply varies.

The crowd density can be estimated with high accuracy even in a congestion situation from the calculation result by using the image feature quantity together with the motion feature quantity obtained using the motion line obtained as a result of tracking a plurality of continuous images.

The acquired crowd density is output on a video in an overlapping manner as a numerical value. In addition, a chart for dividing the crowd density using colors at every level is created in advance, and the crowd density may be displayed on the video in different color according to the obtained value of the crowd density.

In addition, the above example is given on an assumption that the entire screen is a processing region, but a part of the region in the screen is set in advance and then the crowd density may be obtained for each region.

Further, a threshold of the crowd density for warning is set in advance, and in a case where the acquired crowd density exceeds the threshold, a warning may be issued.

Second Embodiment

In a second embodiment, a distance between the start point P1 and the end point P2 of the motion line 1001 illustrated in the straight line 1002 of FIG. 10 may be used as the motion feature quantity obtained by the motion feature quantity acquiring unit 105 of FIG. 1. With the use of the distance, the crowd density can be estimated even in a case where the target crowd moves in a direction perpendicular to the optical axis of a camera.

When the motion feature quantity is acquired, an effect of using the distance between the start point and the endpoint of the motion line will be described using FIG. 19.

An image 1901 of FIG. 19 is an image obtained by capturing persons 1905 and 1906 who move in a direction equal to the optical axis of the camera. The movement direction of the persons 1905 and 1906 in the image 1901 is illustrated by an arrow 1903. Motion lines 1909 and 1900$b$, and the distances 1909$a$ and 1909$c$ between the start points P1 and P'1 and the end points P2 and P'2 of the motion lines 1909 and 1900$b$ are obtained by the motion line acquiring unit 104 according to this embodiment and displayed on the image 1901.

An image 1902 of FIG. 19 is an image of persons 1907 and 1908 which are the same target as that of the image 1901 and captured from a direction perpendicular to the optical axis of the camera. A direction of the movements of the persons 1907 and 1908 in the image 1902 is indicated by an arrow 1904. The person 1907 in the image 1902 is the same person as the person 1905 in the image 1901 when captured from another direction. The person 1908 in the image 1902 is the same person as the person 1906 in the image 1901 when captured from another direction. Similarly, a trace 1900$d$ in the image 1902 is a trace 1909 in the image 1901, and a distance 1900$e$ between a start point P'''1 and an endpoint P'''2 is a distance 1900$a$ between the start point P1 and the end point P2 of the image 1901. Similarly, a trace 1900$f$ in the image 1902 is a trace 1900$b$ in the image 1901, and a distance 1900$g$ between the start point P'''1 and the endpoint P'''2 is a distance 1900$c$ between the start point P'1 and the end point P'2 of the image 1901.

Further, for the convenience of explanation, the same object in the same congested situation has been described by comparing two images having different directions, and the person 1905 (1907) and the person 1906 (1908) may be applied even in a case where the target is in a crowd having different congestion degree.

In the image 1901, the persons move in the same direction as that of the optical axis of the camera, so that the movements in the horizontal direction as illustrated by the motion lines 1909 and 1900$b$ are obtained. As a result, the value of the swaying degree obtained from the motion line 1909 is large (length of the motion line 1909÷distance of the straight line 1900$a$), and the value of the swaying degree obtained from the motion line 1900$b$ is small (length of the motion line 1900$b$÷distance of the straight line 1900$c$), so that it is calculated such that the crowd density of the person 1905 is high, and the crowd density of the person 1906 is low.

On the contrary, in a case where the person moves in a direction perpendicular to the optical axis of the camera as illustrated in the image 1902, especially, in a case where an angle of depression of the camera is small, a resolution in the vertical direction in the screen becomes low. Therefore, the right and left movement of the horizontal swaying may be not clearly obtained as illustrated in the motion line 1900$d$. As a result, the value of the swaying degree obtained from the motion line 1900$d$ (length of the motion line 1900$d$÷distance of the straight line 1900$e$) and the value of the swaying degree obtained from the motion line 1900$f$ (length of the motion line 1900$f$÷distance of the straight line 1900$g$) are low. Similarly, the crowd densities of the persons 1907 and 1908 are low, and as a result there is no difference.

On the contrary, it can be seen that the distance 1900$a$ between the start point P1 and the end point P2 in FIG. 19 is short, and the distance 1900$c$ is long. These distances can be used as distances along the actual advancing direction regardless of the horizontal swaying in the right and left direction. In addition, these values can be used as equivalents to "speed" indicating a moving distance per unit time by setting the number of images for obtaining the distance between the start point and the end point constant.

As well known in the graph in NPL 1, the speed and the density are correlated, so that the feature quantity can be used as a feature quantity to obtain the crowd density. In this way, the feature of the distance between the start point and the end point of the motion line can be similarly applied even in a case where the movement is in a direction perpendicular to the optical axis as illustrated in the image 1902. In other words, it is possible to extract a difference such that the distance 1900$e$ is short, and the distance 1900$g$ is long. Therefore, the distance can be used as the motion feature quantity similarly to the swaying degree.

When the distance between the start point and the end point of the motion line is obtained, the visual distances caused by the resolution between the front and rear sides of the screen are different. Therefore, a depth correction coefficient is obtained through calibration using parameters of the camera, and the visual distances on the front and rear sides are normalized using the depth correction coefficient, so that the distances can be uniformly processed.

According to the second embodiment, even in a case where the accuracy is degraded by the movement in a direction perpendicular to the optical axis of the camera, it is possible to secure the accuracy in estimation of the crowd density. It is possible to obtain a movement distance in the advancing direction without influence of the horizontal swaying by taking the distance between the start point and the end point after tracking the movement for several continuous times in place of the optical flow between two times.

In addition, the above example uses anyone of the swaying degree and the distance between the start point and the endpoint as the motion feature quantity, but both indexes may be used.

REFERENCE SIGNS LIST 110 crowd monitoring system
101 image acquiring unit 102 image input unit
103 image feature quantity acquiring unit
104 motion line acquiring unit
105 motion feature quantity acquiring unit
106 storage unit
107 crowd density acquiring unit
108 arithmetic logic unit
109 output unit
201, 501, 502, 901, 902, 1107, 1507, 1901, 1902 image
202, 503, 504 edge image
301 image feature quantity-crowd density relation storage unit
302 motion feature quantity-crowd density relation storage unit
401, 402, 601, 602, 603, 1201, 1202, 1203, 1204, 1205, 1206, 1207, 1208, 1801 column
403, 404, 604, 605, 1209, 1210, 1211, 1212, 1213, 1214, 1215, 1216, 1217, 1218, 1219, 1220, 1401, 1402, 1601, 1602, 1603, 1604, 1605, 1606, 1607, 1608, 1609, 1610, 1611, 1612 row
701, 1701 graph
702, 1703 region having low crowd density
703, 1702 region having high crowd density
704, 1704 regression formula
801, 903, 906, 1905, 1906, 1907, 1908 person
802, 904, 905, 1001, 1101, 1103, 1501, 1503, 1909, 1900b, 1900d, 1900f motion line
803, 804, 805, 806, 807 time
1002, 1102, 1104, 1502, 1504, 1900a, 1900c, 1900e, 1900g straight line
1105, 1505 swaying degree
1106, 1506 edge
1903, 1904 movement direction

The invention claimed is:

1. A crowd monitoring system that obtains a density of an object on the basis of image information, comprising:
an image acquiring unit that acquires a plurality of images;
an image feature quantity acquiring unit that obtains an image feature quantity of the object in the acquired images;
a motion line acquiring unit that obtains a motion line of the object in the acquired images;
a motion feature quantity acquiring unit that obtains a motion feature quantity of the object on the basis of the obtained motion line;
a storage unit that stores information of a relation between the image feature quantity and the density of the object acquired in advance, and a relation between the motion feature quantity and the density of the object acquired in advance; and
a density acquiring unit that determines the density of the object,
wherein the density acquiring unit obtains
a first density estimation value of the object on the basis of the obtained image feature quantity and a relation between the stored image feature quantity and the density of the object, and
a second density estimation value of the object on the basis of the obtained motion feature quantity and a relation between the stored motion feature quantity and the density of the object.

2. The crowd monitoring system according to claim 1, wherein the image feature quantity is an edge quantity in the image.

3. The crowd monitoring system according to claim 1, wherein the motion feature quantity is a magnitude of a horizontal swaying with respect to an advancing direction of the object obtained from the plurality of acquired images.

4. The crowd monitoring system according to claim 3, wherein the motion feature quantity acquiring unit obtains the motion feature quantity on the basis of a value obtained by dividing a length of the obtained motion line by a distance between a start point and an endpoint of the motion line.

5. The crowd monitoring system according to claim 1, wherein the motion feature quantity is a distance between a start point and an end point of the motion line.

6. The crowd monitoring system according to claim 1, wherein the motion line acquiring unit obtains a feature point with respect to an object in the entire monitoring region in the acquired image, and acquires the motion line by tracking the obtained feature point.

7. The crowd monitoring system according to claim 6, wherein the motion line acquiring unit obtains feature points with respect to a plurality of objects in the entire monitoring region in the acquired image, and acquires a plurality of the motion lines by tracking the plurality of obtained feature points.

8. The crowd monitoring system according to claim 7, wherein the motion feature quantity acquiring unit sends an average value of the motion feature quantities acquired on the basis of the plurality of obtained motion lines to the density acquiring unit.

9. The crowd monitoring system according to claim 1, wherein the density acquiring unit employs any one of the first density estimation value and the second density estimation value on the basis of the obtained first density estimation value, the obtained second density estimation value, and a predetermined threshold.

10. The crowd monitoring system according to claim 9, wherein the density acquiring unit employs the first density estimation value in a case where the obtained first density estimation value is smaller than the predetermined threshold.

11. The crowd monitoring system according to claim 9, wherein the density acquiring unit employs the second density estimation value in a case where the obtained first density estimation value is larger than the predetermined threshold.

12. The crowd monitoring system according to claim 9, wherein the density acquiring unit employs the first density estimation value in a case where the obtained first density estimation value is smaller than the predetermined threshold, and does not obtain the second density estimation value.

* * * * *